(12) United States Patent
Sun

(10) Patent No.: US 8,564,971 B2
(45) Date of Patent: Oct. 22, 2013

(54) FIXING APPARATUS FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 206 days.

(21) Appl. No.: 13/207,460

(22) Filed: Aug. 11, 2011

(65) Prior Publication Data

US 2013/0003289 A1    Jan. 3, 2013

(30) Foreign Application Priority Data

Jun. 28, 2011   (CN) .......................... 2011 1 0176935

(51) Int. Cl.
| | |
|---|---|
| H05K 7/02 | (2006.01) |
| H05K 7/04 | (2006.01) |
| H05K 5/00 | (2006.01) |
| H05K 3/30 | (2006.01) |
| H05K 7/12 | (2006.01) |
| G06F 1/16 | (2006.01) |
| H01F 27/32 | (2006.01) |

(52) U.S. Cl.
   USPC ...... 361/807; 361/809; 361/810; 361/679.33; 174/138 E; 174/138 G

(58) Field of Classification Search
   USPC ......... 361/679.33, 807, 809, 810; 174/138 E, 174/138 G; 439/327, 328
   See application file for complete search history.

(56) References Cited

U.S. PATENT DOCUMENTS

| 5,281,149 | A * | 1/1994 | Petri ................................ 439/66 |
| 6,424,540 | B1 * | 7/2002 | Chen et al. .................... 361/759 |
| 2008/0007931 | A1 * | 1/2008 | Hartman et al. .............. 361/810 |
| 2010/0020485 | A1 * | 1/2010 | Huang ..................... 361/679.36 |

FOREIGN PATENT DOCUMENTS

| TW | M332140 | 5/2008 |
| TW | M404465 | 5/2011 |

* cited by examiner

*Primary Examiner* — Hoa C Nguyen
*Assistant Examiner* — Binh Tran
(74) *Attorney, Agent, or Firm* — Altis & Wispro Law Group, Inc.

(57) ABSTRACT

A fixing apparatus for fixing a hard disk drive includes a bottom plate, and two pairs of fixing members mounted on the bottom plate to sandwich the hard disk drive. The hard disk drive includes two opposite sidewalls, and a bottom wall connected between bottoms of the sidewalls. Two pairs of fixing holes are defined in the bottom wall. Each of the fixing members includes a base to support the hard disk drive, a resilient arm extending up from the base to engage with a corresponding one of the sidewalls of the hard disk drive, and a hook formed on a top of the resilient arm to engage with a top of the hard disk drive. A post extends up from each base, to engage in a corresponding one of the fixing holes of the hard disk drive.

6 Claims, 4 Drawing Sheets

FIXING APPARATUS FOR HARD DISK DRIVE

BACKGROUND

1. Technical Field

The present disclosure relates to an apparatus for fixing a hard disk drive.

2. Description of Related Art

An electronic device, such as a computer, generally includes a frame, and a plurality of screws extending through the frame to fix a hard disk drive and connect the hard disk drive to ground. However, these screws are usually small and difficult to handle, and so the installation of the hard disk drive in the computer is labor-intensive.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
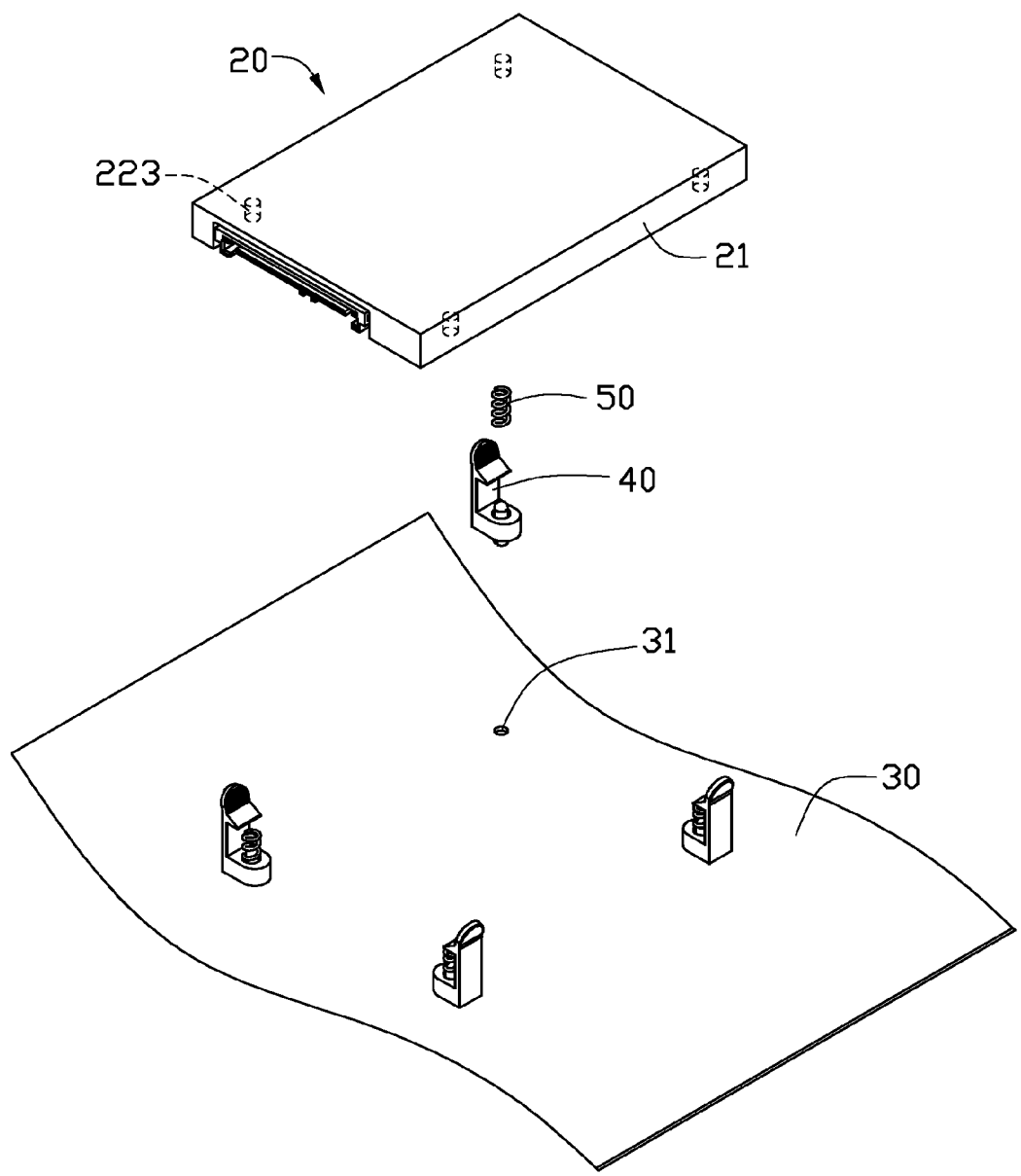
FIG. 1 is an exploded, isometric view of an exemplary embodiment of a fixing apparatus together with a hard disk drive, wherein the fixing apparatus includes a plurality of fixing members.
Figure 2:
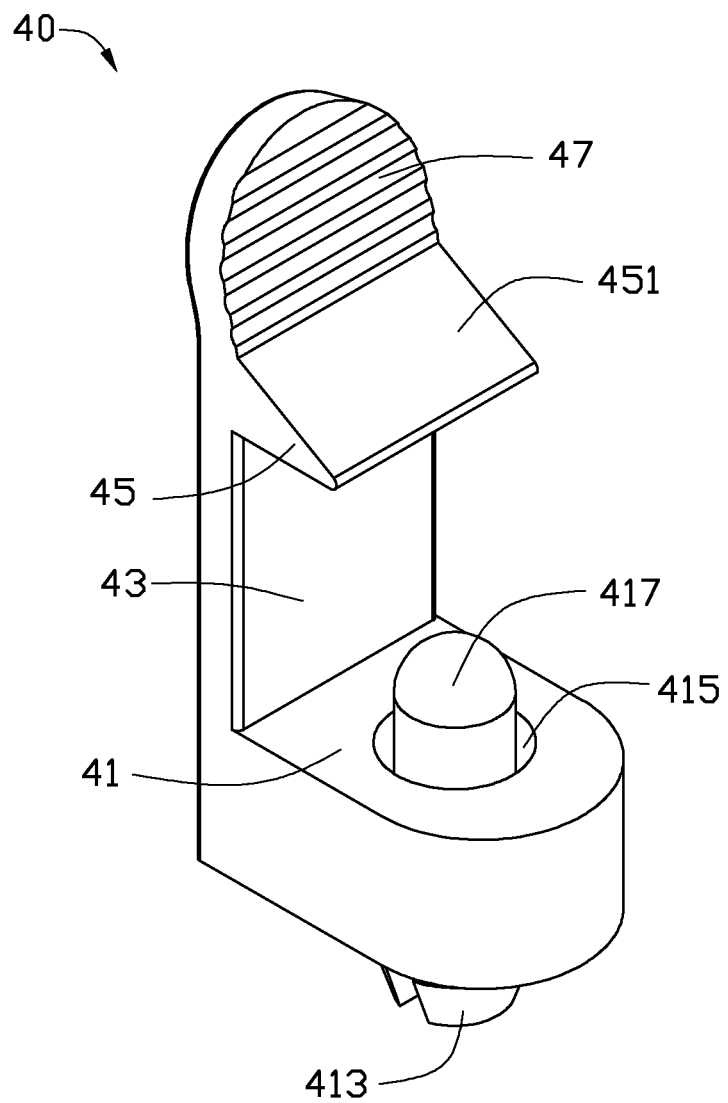
FIG. 2 is an enlarged view of one of the fixing members of FIG. 1.

Referring to FIGS. 1 and 2, an embodiment of a fixing apparatus is provided to fix a hard disk drive 20. The fixing apparatus includes a bottom plate 30, two pairs of fixing members 40, and four resilient members 50. In the embodiment, the resilient members 50 are coil-shaped springs.

The hard disk drive 20 includes two opposite sidewalls 21, and a bottom wall 22 (see FIG. 4) connected between bottoms of the sidewalls 21. Two fixing holes 223 are defined in the bottom wall 22 adjacent to each sidewall 21.

The bottom plate 30 defines two pairs of through holes 31 corresponding to the fixing holes 223 of the hard disk drive 20.

Each fixing member 40 includes a base 41, a resilient arm 43 perpendicularly extending up from an outer side of the base 41, a hook 45 perpendicularly formed on an upper portion of an inner side of the resilient arm 43, and a handle 47 slantingly extending outwards from a top of the resilient arm 43. Two resilient hooking feet 413 extend down from a bottom of the base 41. A circular recess 415 is defined in a top of the base 41. A post 417 extends up from a bottom wall of the recess 415, with a top of the post 417 exposed out of the top of the base 41. A slanted surface 451 is formed on a top of the hook 451. A first end of the slanted surface 451 adjoining the handle 47 is higher than a second end of the slanted surface 451 away from the handle 47.

Figure 3:
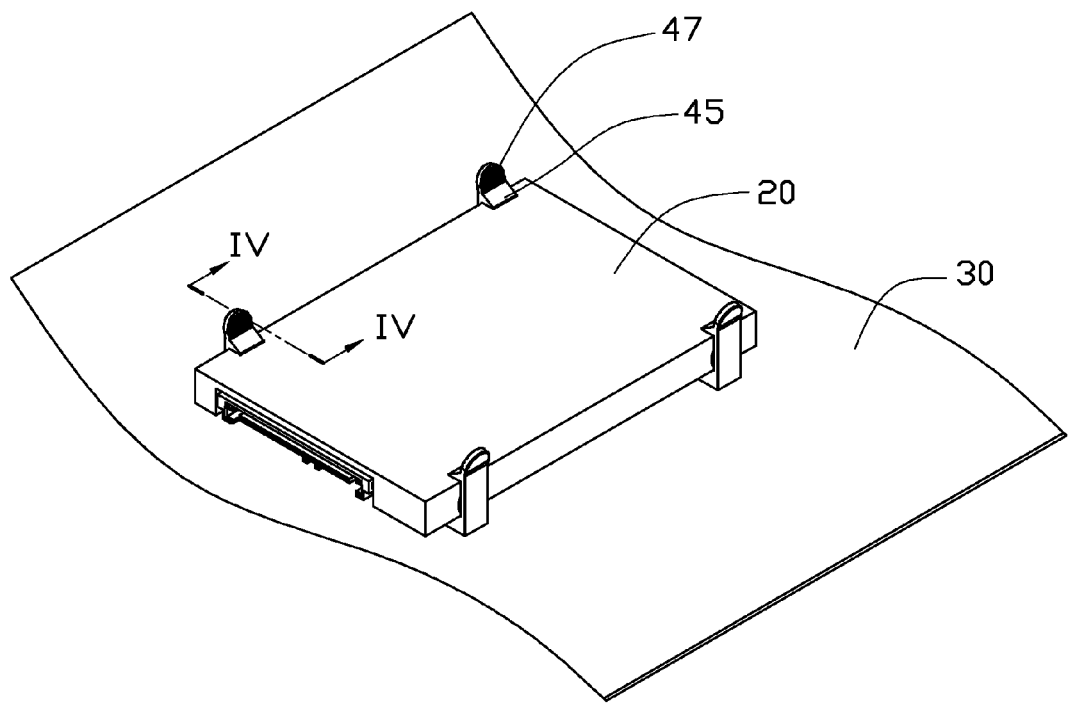
FIG. 3 is an assembled, isometric view of FIG. 1.
Figure 4:
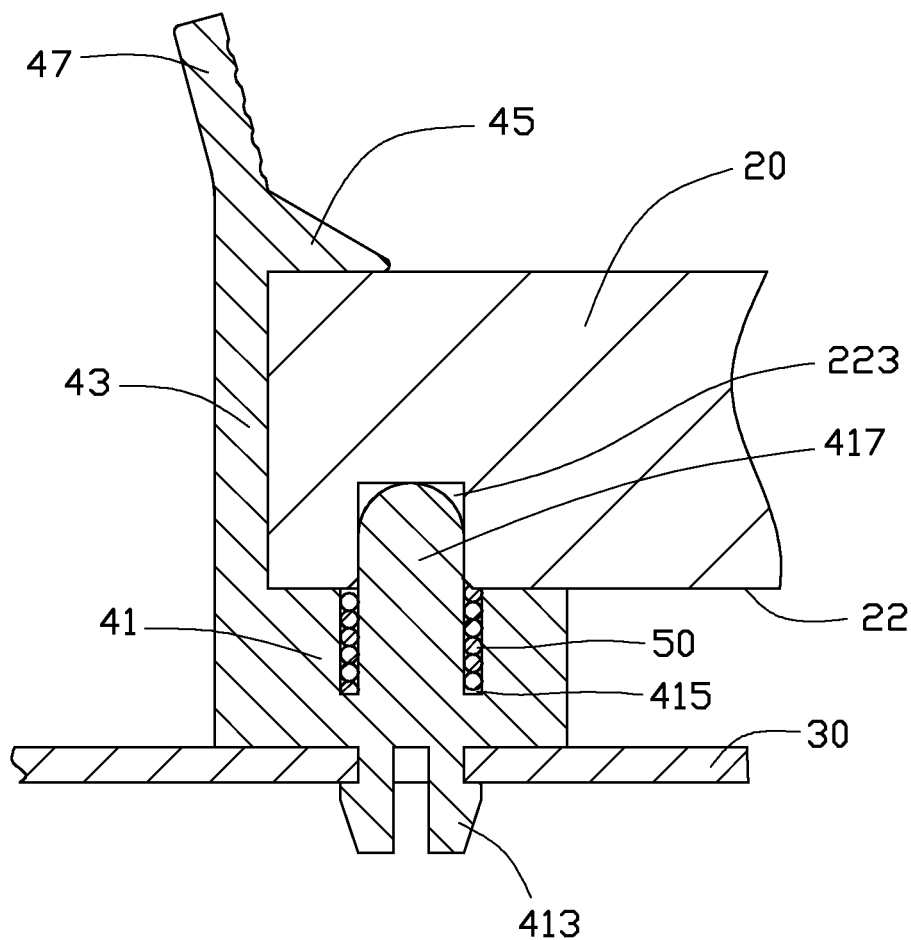
FIG. 4 is a cross-sectional view taken along the line IV-IV of FIG. 3.

Referring to FIGS. 1, 3, and 4, in assembly, the hooking feet 413 of the fixing members 40 are respectively engaged in the through holes 31 of the bottom plate 30. Thereby, the pairs of fixing members 40 are mounted on the bottom plate 30 in two parallel lines. The hooks 45 of each pair of fixing members 40 are arranged in a line facing the fixing members 40 in the opposite line. The resilient members 50 are compressed to allow lower portions of the resilient members 50 to be respectively placed around the posts 417 and received in the corresponding recesses 415. The resilient members 50 are restored, and tops of the resilient members 50 are then higher than the tops of the posts 417.

The hard disk drive 20 is placed above the hooks 45 of the fixing members 40, with the fixing holes 223 of the hard disk drive 20 respectively aligned with the posts 417. The hard disk drive 20 is moved down and abuts against the slanted surfaces 451 of the hooks 45. The resilient arms 43 are deformed outwards. The hard disk drive 20 is passed over the hooks 45 and compresses the resilient members 50. The posts 417 respectively engage in the fixing holes 223 of the hard disk drive 20. When the resilient members 50 are compressed to be completely received in the corresponding recesses 415, the hard disk drive 20 is supported by the bases 41, the resilient arms 43 are restored to engage with the corresponding sidewalls 21, and the hooks 45 are restored to engage with a top of the hard disk drive 20 opposite to the bottom wall 22. Thereby, the hard disk drive 20 is sandwiched between the two pairs of fixing members 40.

To detach the hard disk drive 20 from the fixing apparatus 10, the handles 47 are pulled outwards, to allow the hooks 45 to disengage from the top of the hard disk drive 20. The resilient members 50 are restored to push the hard disk drive 20 upwards. Thereby, the hard disk drive 20 can be easily taken out.

Even though numerous characteristics and advantages of the embodiments have been set forth in the foregoing description, together with details of the structure and the functions of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fixing apparatus for fixing a hard disk drive, the hard disk drive comprising two opposite sidewalls, and a bottom wall connected between bottoms of the sidewalls, two pairs of fixing holes defined in the bottom wall, the fixing apparatus comprising:

a bottom plate; and two pairs of fixing members to be mounted on the bottom plate to sandwich the hard disk drive, each of the fixing members comprising a base to support the hard disk drive, a resilient arm extending up from the base to engage with a corresponding one of the sidewalls of the hard disk drive, and a hook formed on a top of the resilient arm to engage with a top of the hard disk drive, wherein a post extends up from each base, to engage in a corresponding one of the fixing holes of the hard disk drive, a recess is defined in a top of each base, and the fixing apparatus further comprises four resilient members respectively to be received in the recesses of the bases for abutting the hard disk drive.

2. The fixing apparatus of claim 1, wherein each of the fixing members further comprises a handle slantingly extending up and out from the top of the resilient arm.

3. The fixing apparatus of claim 2, wherein a slanted surface is formed on a top of each hook, a first end of the slanted surface adjoining the handle is higher than a second end of the slanted surface away from the handle.

4. The fixing apparatus of claim 1, wherein the posts respectively extend up from bottoms of the recesses, with tops of the posts exposed out of the tops of the bases, each of the resilient members is coil-shaped and placed around the corresponding one of the posts.

5. The fixing apparatus of claim 4, wherein the resilient members are springs.

6. The fixing apparatus of claim 1, wherein two pairs of through holes are defined in the bottom plate, two resilient hooking feet extend down from a bottom of each of the bases, to engage in a corresponding one of the through holes of the bottom plate.

* * * * *